United States Patent
Ranchod

(10) Patent No.: US 12,285,639 B2
(45) Date of Patent: Apr. 29, 2025

(54) REMOTE TESTING SYSTEM FOR SMOKE ALARMS AND METHOD OF USE THEREOF

(71) Applicant: SENSOR GLOBAL PTY LTD, Victoria (AU)

(72) Inventor: Lee Bret Ranchod, Queensland (AU)

(73) Assignee: SENSOR GLOBAL PTY LTD, Victoria (AU)

( * ) Notice: Subject to any disclaimer, the term of this patent is extended or adjusted under 35 U.S.C. 154(b) by 40 days.

(21) Appl. No.: 18/274,199

(22) PCT Filed: Jan. 25, 2022

(86) PCT No.: PCT/AU2022/050034
§ 371 (c)(1),
(2) Date: Jul. 25, 2023

(87) PCT Pub. No.: WO2022/160005
PCT Pub. Date: Aug. 4, 2022

(65) Prior Publication Data
US 2024/0108930 A1 Apr. 4, 2024

Related U.S. Application Data

(60) Provisional application No. 63/141,974, filed on Jan. 26, 2021.

(51) Int. Cl.
*A62C 37/50* (2006.01)
*G08B 17/10* (2006.01)
(Continued)

(52) U.S. Cl.
CPC .............. *A62C 37/50* (2013.01); *G08B 17/10* (2013.01); *G08B 25/10* (2013.01); *G08B 29/043* (2013.01); *G08B 29/145* (2013.01)

(58) Field of Classification Search
CPC ........ A62C 37/50; G08B 17/10; G08B 25/10; G08B 29/043; G08B 29/145;
(Continued)

(56) References Cited

U.S. PATENT DOCUMENTS 7,135,965 B2 * 11/2006 Chapman, Jr. ........... F24F 11/52
236/94
9,454,893 B1 * 9/2016 Warren ..................... H04R 3/00
(Continued)

FOREIGN PATENT DOCUMENTS

KR     10-2021-0004037 A     1/2021

OTHER PUBLICATIONS

Search Report dated Mar. 22, 2022 issued in corresponding International Application No. PCT/AU2022/050034.
(Continued)

*Primary Examiner* — Eric Blount
(74) *Attorney, Agent, or Firm* — Nath, Goldberg & Meyer; Joshua B. Goldberg

(57) ABSTRACT

A remote testing system for smoke alarm systems and method of use thereof are disclosed. The system includes at least one controller associated with at least one building having a plurality of smoke alarm systems installed therein, at least one remotely accessible server operatively connected to the at least one controller for issuing a testing command to at least one selected smoke alarm system; at least one database operatively associated with the at least one remotely accessible server for storing operational data of each of the plurality of smoke alarm systems tested; and at least one external processing device. The external processing device is programmed to: instruct said at least one remotely accessible server to issue said testing command; receive said operational data for the test; and either generate
(Continued)

an alert reporting a faulty smoke alarm system or generate a smoke alarm system compliance report.

19 Claims, 3 Drawing Sheets

(51) Int. Cl.
  *G08B 25/10* (2006.01)
  *G08B 29/04* (2006.01)
  *G08B 29/14* (2006.01)
(58) Field of Classification Search
  CPC . G08B 25/009; G08B 26/007; H04L 43/0817; H04L 43/50; H04L 67/02; H04L 67/1097; H04L 63/1425; H04L 43/04; H04L 67/025; H04L 67/125; G05B 23/0205; H04Q 2209/40; H04Q 2209/75; H04W 84/12
  USPC .......................................................... 340/514
  See application file for complete search history.

(56) References Cited

U.S. PATENT DOCUMENTS

| | | | |
|---|---|---|---|
| 11,749,096 B2* | 9/2023 | Kulkarni | G08B 29/145 340/506 |
| 2005/0156731 A1* | 7/2005 | Chapman, Jr. | F24F 11/58 340/521 |
| 2009/0295571 A1* | 12/2009 | Hosey | G08B 29/16 340/540 |
| 2012/0286946 A1* | 11/2012 | Karl | G08B 29/126 340/514 |
| 2015/0123782 A1* | 5/2015 | Zwirn | G08B 29/126 340/506 |
| 2020/0175767 A1* | 6/2020 | Stivi | G08B 25/10 |
| 2020/0219375 A1* | 7/2020 | Peros | G08B 27/00 |

OTHER PUBLICATIONS

Written Opinion of the International Searching Authority dated Mar. 22, 2022 issued in corresponding International Application No. PCT/AU2022/050034.

* cited by examiner

REMOTE TESTING SYSTEM FOR SMOKE ALARMS AND METHOD OF USE THEREOF

This is a National Phase Application filed under 35 U.S.C. 371 as a national stage of PCT/AU2022/050034, filed Jan. 25, 2022, an application claiming the benefit of U.S. Provisional Application No. 63/141,974, filed Jan. 26, 2021, the content of each of which is hereby incorporated by reference in its entirety.

TECHNICAL FIELD

The present invention generally relates to a smoke alarm testing system. More specifically, the present invention concerns a system for remote testing of smoke alarm systems.

BACKGROUND

Smoke alarm systems are installed in buildings as a safety precaution for the purposes of sounding an alarm should a fire begin within a building. Generally, a smoke alarm system has an electrical sensing circuit mounted within a housing that allows smoke to enter the housing and be sensed by the electrical sensing circuit. When a sufficient amount of smoke is detected by the electrical sensing circuit, an alarm, such as, e.g., a buzzer, is generated to alert people within the building and the vicinity of the smoke alarm system of the presence of a fire.

It is advisable to periodically check smoke alarm systems to test and monitor that they are functioning properly. A faulty a smoke alarm system may fail to sense smoke and/or generate an alarm to give notice of a fire. Such failures can and have resulted in fire spreading undetected through a building, ultimately the destruction of the building, and, in the worst case scenario, the death of one or more occupants within the building. Accordingly, regular testing and maintenance is recommended to ensure the reliability of an installed smoke alarm system.

Indeed, in some jurisdictions property managers are legally required to test and clean smoke alarm systems between tenancies. Indeed, property managers have previously been held legally liable for smoke alarm failures.

A common way of testing a smoke alarm system is to press and hold a "test" button located on a face of the smoke alarm system until the alarm sounds. However, such testing requires a person to actively depress the "test" button on each smoke alarm system within a building or tenancy on a periodic basis, which due to the inconvenience is often ignored or conveniently forgotten.

Further, smoke alarm systems are usually mounted on ceilings or other elevated places that are not readily accessible for testing. As such, testing often involves the additional use of a ladder or other like elevating means to test each smoke alarm system. Apart from the fall hazard that ladders and such like elevating means pose, their required use adds to the inconvenience and further supports a user to ignore or conveniently forget the task.

Earlier systems and methods for testing and monitoring fire equipment and live safety equipment are known.

For example, US Patent Publication No. 2017/0104823 A1 discloses a system for monitoring, testing, inspecting and maintaining fire equipment located at a property. However, the system is overly complicated and is primarily directed to fire inspection/repair/monitoring companies and fire departments rather than property managers. Further, the system neither discloses nor suggest a means for testing smoke alarm systems.

U.S. Pat. No. 7,649,450 discloses a method of conducting an authenticated test of an alarm system. However, the disclosed method is overly complicated involving the conducting of first and second access procedures between the alarm system and an authentication server and remote device and the authentication server. Further, the system is primarily directed to certification and verification of equipment by an inspector rather than property managers.

It will be clearly understood that, if a prior art publication is referred to herein, this reference does not constitute an admission that the publication forms part of the common general knowledge in the art in Australia or in any other country.

SUMMARY OF INVENTION

Embodiments of the present invention provide a remote testing system for smoke alarm systems and a method of use thereof, which may at least partially address one or more of the problems or deficiencies mentioned above or which may provide the public with a useful or commercial choice.

According to a first aspect of the present invention, there is provided a remote testing system for smoke alarm systems, said system including:
  at least one controller associated with at least one building having a plurality of smoke alarm systems installed therein, said at least one controller being in communication with the plurality of smoke alarm systems;
  at least one remotely accessible server operatively connected to the at least one controller for receiving and monitoring output data from the plurality of smoke alarm systems and for issuing a testing command to at least one selected smoke alarm system of the plurality of smoke alarm systems via said at least one controller;
  at least one database operatively associated with the at least one remotely accessible server for storing operational data, including at least an operational status, testing data and location of each of the plurality of smoke alarm systems tested; and
  at least one external processing device programmed to:
    receive an input command from a user to remotely test said at least one selected smoke alarm system of the plurality of smoke alarm systems;
    instruct said at least one remotely accessible server to issue said testing command to said at least one selected smoke alarm system via said at least one controller;
    receive said operational data for the test from the at least one database including any operational anomalies; and one of:
    responsive to an operational anomaly being identified, generate an alert reporting a faulty said at least one selected smoke alarm system; and
    responsive to no operational anomaly being identified, generate a smoke alarm system compliance report for said at least one selected smoke alarm system.

Advantageously, the present invention provides a mean for a property manger end user to readily and easily test all, or a select few, smoke alarm systems in a multi-tenanted/occupant building. Further, the system via its controller arrangement does not rapidly drain battery powered smoke alarm systems when testing or polling for operational data thereby enabling the system to be compatible with modern smoke alarm systems powered by a 10 year non-replaceable battery.

As indicated above, the present invention is directed to a remote testing system for smoke alarm system, preferably a plurality of smoke alarm systems installed in a multi-occupant/multi-tenanted building, such as, apartment and office complexes. The present invention is primarily directed to property manager users, who with the use of the system can oversee the remote testing of the plurality of smoke alarm systems with minimal disturbance to occupants/tenants for compliance with building and tenancy smoke alarm testing codes.

The building may be any suitable type having at least one tenant or occupant. In some embodiments, the building may be a single occupant/tenant. In other preferred embodiments, the building may have multiple separate occupants or tenants, such as, e.g., an apartment complex or office complex.

Each building may include a plurality of smoke alarm systems. The smoke alarm systems may be suitably installed within the building.

Each smoke alarm system may be of any suitable size, shape and construction.

Generally, each smoke alarm system may include a smoke sensor, a power supply, an alarm and a housing configured to be fastened or mounted to a surface and for housing the aforementioned components.

In some embodiments, the smoke sensor may include a pair of ionization chambers as is known in the art.

In other preferred embodiments, the smoke sensor may include a photoelectric sensor as is known in the art.

The power supply may include one or more batteries and/or a mains power supply.

In some jurisdictions, legislation has passed requiring dwellings being leased, released or sold to have smoke alarm systems installed in each bedroom and hallways that connect each bedroom to the rest of the dwelling. The installed smoke alarm systems must be interconnected and either mains powered or have a 10-year non-removable battery.

In this regard, the applicant is aware that buildings being retrofitted to comply with the new legislation are typically being installed with a single mains-powered smoke alarm system with the remaining smoke alarm systems being installed being powered by a 10-year non-removable battery.

The alarm may be an audible or visual alarm, preferably the former.

Each smoke alarm system may include a self-test function which enables the alarm function of the smoke alarm to be remotely tested.

In some embodiments, the self-test function may temporarily close the alarm circuit of the smoke alarm system causing the audible or visual alarm to be activated while the circuit is closed.

The activation of the audible or visual alarm may be indicative that the smoke alarm is functioning correctly. Conversely, a failure to activate or only partial activation (e.g., a reduced audible or visual alarm) may be indicative that the smoke alarm system is faulty and/or in need of service, i.e., an operational anomaly.

In some such embodiments in which the alarm is an audible alarm, each smoke detector may further include a sound sensor, such as, e.g., a microphone, for detecting the audible alarm when the self-test function is initiated and for providing feedback that the test is passed or failed, for example.

In other such embodiments in which the alarm is a visual alarm, each smoke detector may further include a light sensor, such as, e.g., photoresistors, photodiodes and/or phototransistors, for detecting the visual alarm when the self-test function is initiated and for providing feedback that the test is passed or failed, for example.

In yet other such embodiments, the alarm circuit of the smoke alarm system may include an electronic tester, such as, e.g., a continuity tester, for determining when the alarm circuit is closed due to the self-test function and for providing feedback that the test is passed or failed, for example. In such embodiments, the tester may include an indicator capable of providing remote feedback.

In other embodiments, the self-test function may temporarily close the alarm circuit and bypass the audible or visual alarm. In such embodiments, each smoke alarm system may include an electronic tester as previously described for providing feedback that the test is passed or failed, preferably remote feedback. In such embodiments, an intact closed circuit may be indicative that the smoke alarm system is functioning correctly whereas an interrupted circuit or high resistivity may be indicative that the smoke alarm system is faulty and/or in need of service, i.e., an operational anomaly.

Advantageously, such embodiments may enable each smoke alarm system to be remotely tested without the alarm activating and potentially annoying an occupant/tenant.

In some embodiments, the smoke alarm systems may be addressable. For example, each smoke alarm system may report an operational status when polled, e.g., by the controller or the at least one remotely accessible server. The operational status may include that the smoke alarm is on or active.

In other embodiments, each smoke alarm system may be assigned a unique identifier and its location relative to the building may be recorded.

In some embodiments, each smoke alarm system may include a wireless communications module, such as, e.g., a wireless network interface controller, such that the smoke alarm system may wirelessly connect to an external device via wireless network (e.g., Wi-Fi (WLAN) communication, Satellite communication, RF communication, infrared communication or Bluetooth™). Advantageously, the wireless communications module may provide a redundant wireless communications path in the event wired communications connecting each smoke alarm system to the controller is damaged or fails.

As indicated, the system includes at least one controller associated with the at least one building and in communication with the plurality of smoke alarms installed in the buildings.

Generally, at least one controller may be located with each building for communication with all the smoke alarm systems installed therein.

The at least one controller may be of any suitable size, shape and construction to function as a bridge or hub between the plurality of smoke alarm systems installed in a building and the at least one remotely accessible server.

Advantageously, the use of the controller to interconnect each smoke alarm system with the at least one remotely accessible server provides more energy efficient communications than having each smoke alarm system report directly. For example, having each smoke alarm system periodically report to the at least one remotely accessible server directly via its wireless communications module would considerably reduce the 10 year life span of the non-removable battery and result in unwanted costs in having the smoke alarm system be replaced.

The controller may include a processing device, including one or more processors and one or more memory units containing executable instructions/software to be executed by the one or more processors, such as, e.g., a microcomputer. The executable instructions/software may include the self-test function along with other programs, for example.

The controller may include a communications module for connecting the controller to the plurality of smoke alarm systems and the at least one remotely accessible server. The controller may be connectable in any suitable way.

For example, the controller may connect to the plurality of smoke alarm systems by a wired or wireless connection, preferably wired.

The communications module may preferably be a modem enabling the controller to connect to the remotely accessible server via a wireless network (e.g., Wi-Fi (WLAN) communication, Satellite communication, RF communication, infrared communication, or Bluetooth™). For example, and as indicated above, in some embodiments, the modem may be a cellular modem. In other embodiments, the modem may be a radio modem.

The controller may include at least one power source for powering the processing device and communications module.

In some embodiments, the power source may include an on-board power source, such as, e.g., one or more batteries.

In other embodiments, the power source may include one or more photovoltaic cells, an inverter and one or more batteries for storing electricity generated and from which the base station may draw power.

In yet other embodiments, the power source may include a mains supply.

In preferred embodiments, the power source may include a mains supply together with a redundant power source for powering the controller in the event of a power failure. The redundant power source may include an on-board power source as previously described.

In preferred embodiments, the at least one controller may be a 4G NB-IoT bridge.

As indicated, the system includes at least one remotely accessible server operatively connected to the at least one controller for receiving and monitoring output data from the plurality of smoke alarm systems and for issuing a testing command to at least one selected smoke alarm system of the plurality of smoke alarm systems via said at least one controller.

The at least one remotely accessible server may be any appropriate server computer, distributed server computer, cloud-based server computer, server computer cluster or the like. The server may include one or more processors and one or more memory units containing executable instructions/software to be executed by the one or more processors, such as, e.g., a test command or a schedule test command.

As indicated, the system further includes at least one database for storing operational data. The operational data may include any one of testing data of each smoke alarm system, the operational status of each smoke alarm system and/or the location of each smoke alarm system relative to the building.

In some embodiments, the at least one database may additionally store building data. The building data may include any one of building name and address details, building occupancy/tenancy details, building landlord details and lease details. The occupancy/tenancy and building landlord details may include contact numbers, emails, and names. The lease details may include any one of lease start date, lease duration and copy of the lease agreement.

In some embodiments, the at least one database may additionally include service details associated with the at least one building. The service details may include any one of a service history for each of the plurality of smoke alarm systems installed at the at least one building and the relevant trades person's name and contact details.

Generally, the at least one remotely accessible server may be in communication with the at least one database.

For example, in some embodiments, the server may be linked to or may maintain all data within the at least one database. The server may collect and record data output from each of the smoke alarm systems in the at least one database, preferably against a smoke alarm system record corresponding to each respective smoke alarm system.

In some embodiments, the remotely accessible server may further continuously or periodically monitor the at least one database for changes in operational data or data output for any one of the plurality of smoke alarm systems. The remotely accessibly server may generate an alert when a change in the data output is indicative of a failing smoke alarm system or an operational anomaly, for example. The alert may be generated, or transmitted to, the at least one external processing device.

In some embodiments, the at least one database may additionally include scheduling data for periodic remote testing of the at least one selected smoke alarm system. In such embodiments, the at least one remotely accessible server may issue the testing command to the at least one selected smoke alarm system based on the scheduling data. Additionally, the at least one remotely accessible server may generate and/or transmit an alert to a property manager and/or a tenant/occupant near the at least one selected smoke alarm system being tested advising of the scheduled test. The alert may be sent to an external processing device of the property manager and/or a tenant/occupant by way of email, Short Message Service (SMS) protocol, Unstructured Supplementary Service Data (USSD) protocol, over a secure Internet connection, or by way of data communication enabled by a software application installed on the external processing device.

The remotely accessible server may be configured to transmit communications to and receive communications from the at least one controller and the at least one external processing device over a communications network, which may include, amongst others, the Internet, LANs, WANs, GPRS network, a mobile communications network, a radio network (UHF-band), etc., and may include wire and/or wireless communication links, preferably the latter.

In some embodiments, the communications may be received and transmitted via a private network connection established between the at least one controller, the at least one remotely accessible server and the at least one external processing device.

For example, in some embodiments, the private network connection may be a secure communication session across an encrypted communication channel such as Hypertext Transfer Protocol Secure (HTTPS), Transport Layer Security/Secure Sockets Layer (TLS/SSL) or some other secure channel.

In other embodiments, the private network connection may be a VPN connection established using an encrypted layered tunnelling protocol and authentication methods, including identifiers, passwords and/or certificates.

For example, in some such embodiments, the at least one controller and/or the at least one external processing device may be assigned a unique identifier that may be registered with the server. In use, the server may establish a VPN connection with the at least one controller and/or the at least one external processing device upon authenticating the identifier assigned to the at least one controller and/or the at least one external processing device.

In other embodiments, communications between the at least one remotely accessible server and the at least one external processing device may require authentication, such as, e.g., identifiers, passwords, captcha and/or two-factor (2FA) authentication.

As indicated, the system includes at least one external processing device enabling a user to interact with the system.

The external processing device may include a computer, a tablet, a smart phone, a smart watch or a PDA, for example.

The external processing device may connect to the at least one remotely accessible server by a wired connection or a wireless connection via a wireless network (e.g., Wi-Fi (WLAN) communication, RF communication, infrared communication, or Bluetooth™), preferably the latter.

The at least one external processing device and/or the at least one remotely accessible server may include software configured to be run on the external processing device and/or the server for interacting with the system. The software may preferably be interactive.

In some embodiments, the software may include an app configured to be run on a mobile external processing device, such as, e.g., a smart phone.

In other embodiments, the software may be a software program, browser extension and/or plug-in extension configured to be run on the external processing device.

In other embodiments, the remotely accessible server may include a web server providing a graphical user interface through which a user may interact with the system and the remotely accessible server via their external processing device.

The web server may accept requests, such as HTTP responses, along with optional data content, such as web pages (e.g., HTML documents) and linked objects. Generally, the web server, upon authentication, may enable the user to receive and transmit communications and commands with the remotely accessible server.

As indicated, the system is generally directed towards property manager users and provides full access to registered property managers for the relevant buildings they are responsible for.

In some embodiments, the system may additionally provide limited access to other user types, such as, e.g., landlords, occupants/tenants and/or trades persons.

For example, in some such embodiments, a landlord may be able to interact with the remotely accessible server to input details about one or more building tenancies they own and/or lease details about the leasing of the one or more building tenancies.

Likewise, in other such embodiments, an occupant/tenant may interact with the remotely accessible server to input and/or modify contact numbers, emails, and names and/or desired scheduling for self-testing of the one or more smoke alarm systems in their tenancy or dwelling.

Moreover, in yet other such embodiments, and upon receiving authentication details, relevant trades people may interact with the remotely accessible server to receive details of one or more smoke alarm systems requiring serving. The details may additionally include a location of the smoke alarm system, the contact details of the owner/occupant/tenant of the tenancy or dwelling and/or a complete service history of the smoke alarm system. Further, upon completion of the service, the trades person may input updated details about the service performed, such as, e.g., battery replaced, or smoke alarm system replaced.

As indicated, the at least one remotely accessible server may include a report function in which the server may interrogate the at least one database and generate a report for transmission to an end user via the at least one external processing device.

In some such embodiments, the report may include a schedule of testing for the at least one selected smoke alarm system in an occupancy/tenancy and/or building.

In other such embodiments, the report may include a log of all past testing data for the at least one selected smoke alarm system in an occupancy/tenancy and/or building.

In yet other such embodiments, the report may include a fault and/or service request report for any of the at least one selected smoke alarm system in an occupancy/tenancy and/or building that failed testing or exhibit operational anomalies.

In further such embodiments, the report may include a smoke alarm system compliance report for the at least one selected smoke alarm system in an occupancy/tenancy and/or building. Preferably, in such embodiments, the report may be in a form that may be printed or electronically submitted to a relevant building or tenancy office for compliance purposes.

According to a second aspect of the present invention, there is provided a method of remotely testing smoke alarm systems in at least one building, said method including:
  providing the remote testing system of the first aspect;
  inputting a remote test command on at least one external processing device of the system for testing at least one selected smoke alarm system of a plurality of smoke alarm systems installed in the at least one building;
  receiving operational data for the testing on the at least one external processing device, including any operational anomalies; and one of:
  responsive to an operational anomaly being identified, generating an alert reporting a faulty said at least one selected smoke alarm system; and
  responsive to no operational anomaly being identified, generating a smoke alarm system compliance report for said at least one selected smoke alarm system.

The method may include one or more features or characteristics of the system as hereinbefore described.

The inputting a remote test command may include a single test or the inputting of a periodic testing schedule, such as, e.g., weekly, fortnightly, monthly, biannually, or annually.

The inputting may include interacting with the remote testing system via an external processing device.

In some embodiments, the inputting may include the use of an app configured to run on a mobile external processing device, such as, e.g., a smart phone.

In other embodiments, the inputting may include the running of a software program, browser extension and/or plug-in extension on an external processing device, such as, e.g., a computer.

In yet other embodiments, the inputting may include interacting with the remotely accessible server by way of a web server using a browser on an external processing device.

The receiving operational data may include generation of a report on an outcome of the testing.

The operational data may include whether or not the at least one selected smoke alarm system passed the test function.

The operational data may also include whether the at least one smoke alarm system exhibited any operational anomalies, such as, e.g., if the smoke alarm system failed the test function, whether the smoke alarm system is reporting properly when polled and/or in the event of battery-powered smoke alarm systems, whether the battery is reporting a low charge.

In scenarios in which an operational anomaly is identified, an alert may be generated reporting the faulty said at least one selected smoke alarm system to the user.

In some embodiments, the system may additionally send a service request to a registered service provider or, alternatively, prompt the user to send the service request.

The alert may include details of the faulty said at least one selected smoke alarm system. The details may include any one of location details, service history details, address details, occupancy/tenancy details, and landlord details.

In scenarios in which no operational anomaly is identified, the system may generate a smoke alarm system compliance report for said at least one selected smoke alarm system.

The report may preferably be generated in a form that may be printed or electronically submitted to a relevant building or tenancy office for compliance purposes.

Any of the features described herein can be combined in any combination with any one or more of the other features described herein within the scope of the invention.

The reference to any prior art in this specification is not and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of Invention in any way. The Detailed Description will make reference to a number of drawings as follows.

DETAILED DESCRIPTION

Figure 1:
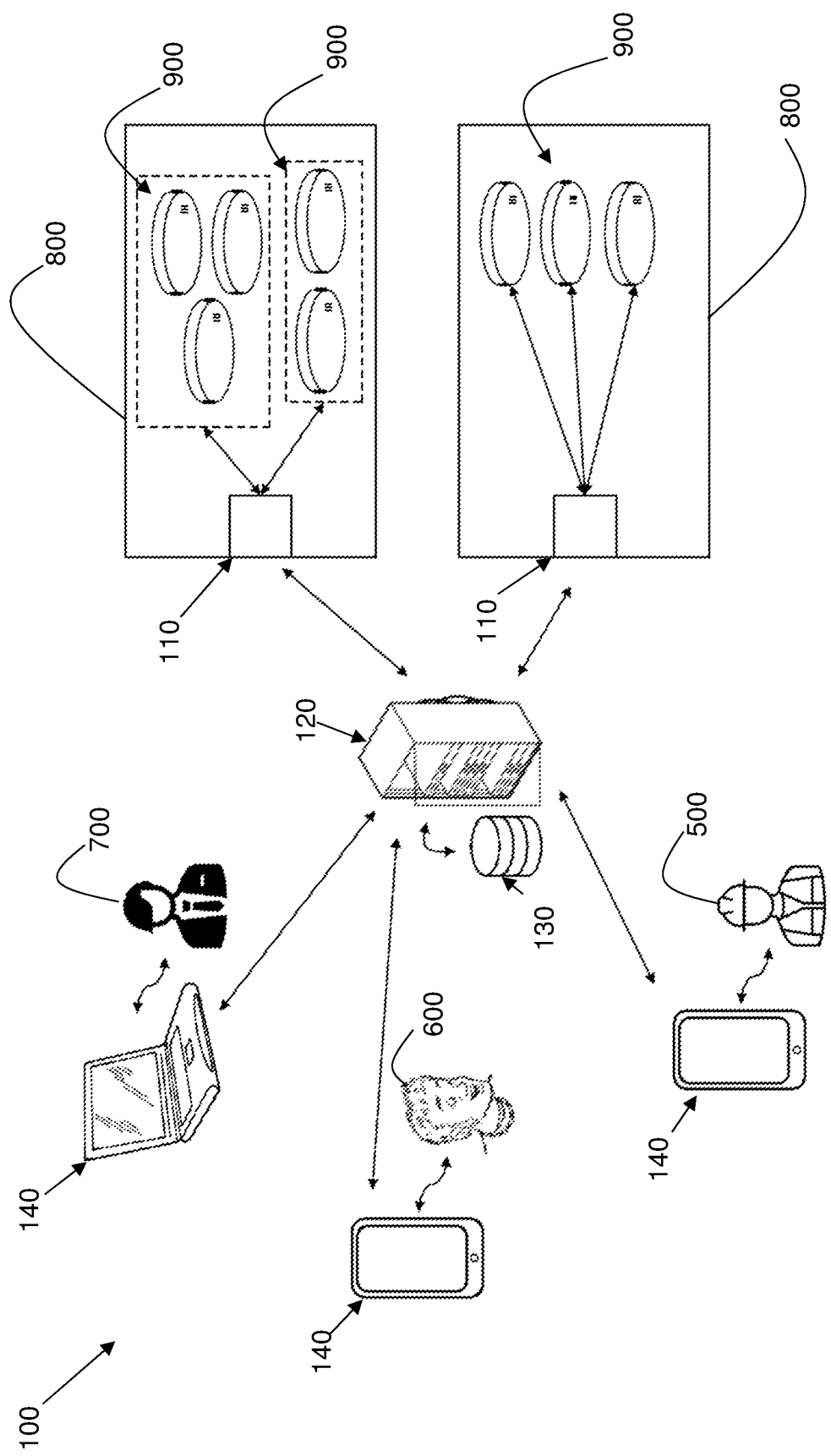
FIG. 1 is a schematic showing a remote testing system for smoke alarm systems according to an embodiment of the present invention.
Figure 2:
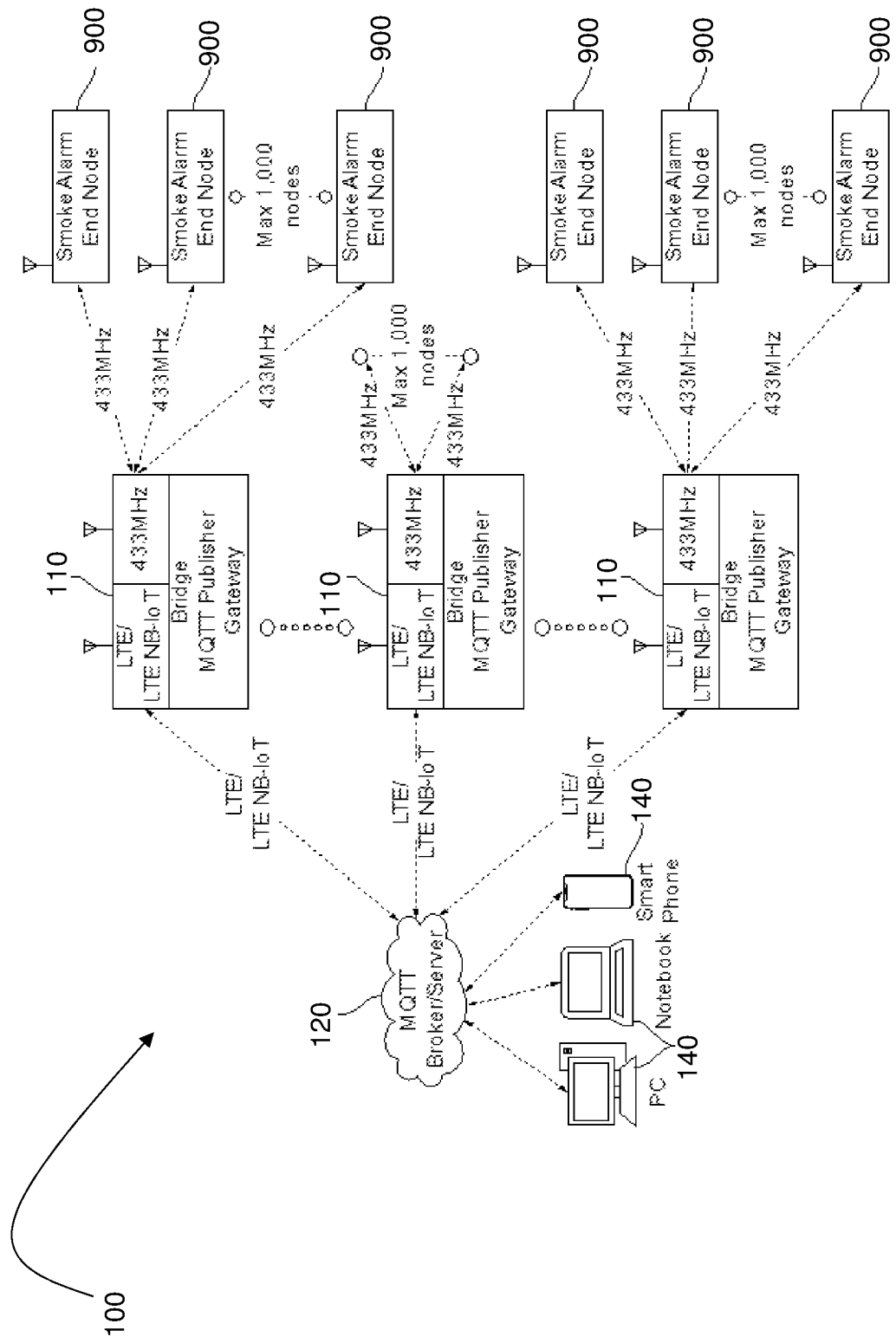
FIG. 2 is a block diagram of a remote testing system for smoke alarm systems according to another embodiment of the present invention.

FIGS. 1 and 2 show embodiments of a remote testing system (100) for smoke alarm systems (900).

Referring to FIG. 1, the remote testing system (100) for smoke alarm systems (900) includes a controller (110) associated with each building (800) having a plurality of smoke alarm systems (900) installed therein. Each controller (110) is in communication with all the smoke alarm systems (900) installed in its corresponding building (800).

The system (100) further includes at least one remotely accessible server (120) operatively connected to each controller (110) for receiving and monitoring output data from the smoke alarm systems (900) and for issuing a testing command to one or more selected smoke alarm systems (900) via the relevant controller (110). A database (130) is operatively associated with the remotely accessible server (120) for storing operational data, including at least an operational status, testing data and a location of each of the smoke alarm systems (900).

The system (100) lastly includes an external processing device (140). The external processing device (140) is programmed to: (i) receive an input command from a property manager user (700) to remotely test one or more selected smoke alarm systems (900); (ii) instruct the remotely accessible server (120) to issue the testing command to the one or more selected smoke alarm systems (900) via the corresponding controller (110); (iii) receive operational data for the test from the database (130), including any operational anomalies; and then (iv) one of: (a) responsive to an operational anomaly being identified, generate an alert reporting any faulty selected smoke alarm systems (900); or (b) responsive to no operational anomaly being identified, generate a smoke alarm system compliance report for the selected one or more smoke alarm systems (900).

The system (100) is primarily intended for use in multi-occupant/multi-tenanted buildings (800), such as, e.g., apartment and office complexes. Further, the system (100) is primarily directed to property manager users (700), who with the use of the system (100) can oversee the remote testing of a plurality of smoke alarm systems (900) with minimal disturbance to occupants/tenants (600) for compliance purposes with relevant building and tenancy smoke alarm testing codes.

As shown, each building (800) includes a plurality of smoke alarm systems (900) installed across two or more tenancies/dwellings.

Each smoke alarm system (900) includes a smoke sensor, a power supply, an alarm and a housing configured to be fastened or mounted to a surface and for housing the aforementioned components.

The smoke sensor is a photoelectric sensor as is known in the art.

The power supply includes either a mains electricity supply or a 10-year non-removable battery. Generally, the plurality of smoke alarm systems (900) installed in a single dwelling or tenancy will include a single mains-powered smoke alarm system (900) with the remainder being battery powered.

The alarm is an audible alarm.

Each smoke alarm system (900) include a self-test function enabling the alarm function of the smoke alarm system (900) to be remotely tested.

The self-test function temporarily closes an alarm circuit of the smoke alarm system (900) for causing the audible alarm to be activated.

The activation of the audible alarm is indicative that the smoke alarm system (900) is functioning correctly. Conversely, a failure to activate or only partial activation (e.g., a reduced audible alarm) is indicative that the smoke alarm system (900) is faulty and/or in need of service, i.e., an operational anomaly.

In some embodiments, each smoke alarm system (900) further includes a sound sensor, such as, e.g., a microphone, for detecting the audible alarm when the self-test function is initiated and for providing feedback that the test is passed or failed, for example.

In other embodiments, each smoke alarm system (900) further includes an electronic tester, such as, e.g., a continuity tester, for determining when the alarm circuit is closed due to the self-test function and for providing feedback that the test is passed or failed, for example. In such embodiments, the tester includes an indicator capable of providing remote feedback to the controller (110).

In yet other embodiments, the self-test function temporarily closes the alarm circuit and bypasses the audible alarm. In such embodiments, each smoke alarm system (900) includes an electronic tester as previously described for providing remote feedback that the test is passed or failed. Again, an intact closed circuit is indicative that the smoke alarm system (900) is functioning correctly whereas an interrupted circuit or high resistivity is indicative that the smoke alarm system (900) is faulty and/or in need of service, i.e., an operational anomaly.

As shown, each building (800) serviced by the system (100) includes a controller (110) in communication with the plurality of smoke alarms (900) installed in the building (800).

Each controller (110) functions as a bridge or hub between the plurality of smoke alarm systems (900) installed in the building (800) and the at least one remotely accessible server (120). Typically, each controller (110) is a 4G NB-IoT bridge.

Advantageously, the use of a controller (110) to interconnect each smoke alarm system (900) with the at least one remotely accessible server (120) provides more energy efficient communications than having each smoke alarm system (900) report directly. For example, having each smoke alarm system (900) periodically report to the at least one remotely accessible server (120) directly via a wireless communications module would considerably reduce the 10 year life span of battery-powered smoke alarm systems (900) and result in unwanted costs in having the smoke alarm systems (900) replaced before their 10 year term.

Each controller (110) includes a processing device, including one or more processors and one or more memory unit containing executable instructions/software to be executed by the one or more processors, such as, e.g., a microcomputer. The executable instructions/software include the self-test function along with other programs.

The controller (110) includes a communications module for connecting the controller (110) to the plurality of smoke alarm systems (900) and the at least one remotely accessible server (120). The controller (110) can be connected to the plurality of smoke alarm systems (900) either by a wired or wireless connection.

The communications module includes a modem enabling the controller (110) to connect to the remotely accessible server (120) via a wireless network (e.g., Wi-Fi (WLAN) communication, Satellite communication, RF communication, infrared communication, or Bluetooth™). The modem can be a cellular modem or a radio modem.

The controller (110) include at least one power source for powering the processing device and communications module. The power source can include a mains supply together with a redundant power source for powering the controller (110) in the event of a power failure. The redundant power source includes one or more batteries.

As also shown, the system (100) includes at least one remotely accessible server (120) operatively connected to each controller (110) for receiving and monitoring output data from the plurality of smoke alarm systems (900) and for issuing a testing command to one or more selected smoke alarm systems (900) via the corresponding controller (110).

The at least one remotely accessible server (120) can be any appropriate server computer, distributed server computer, cloud-based server computer, server computer cluster or the like. The server (120) includes one or more processors and one or more memory units containing executable instructions/software to be executed by the one or more processors, such as, e.g., a test command or a schedule test command.

Along with the server (120), the system (100) further includes a database (130) for storing operational data.

The operational data includes any one of testing data of each smoke alarm system (900), the operational status of each smoke alarm system (900) and/or the location of each smoke alarm system (900) relative to the building (800).

The database (130) additionally stores building data. The building data includes any one of building name and address details, building occupancy/tenancy details, building landlord details and lease details. The occupancy/tenancy and building landlord details include contact numbers, emails, and names. The lease details may include any one of lease start date, lease duration and copy of the lease agreement.

The database (130) additionally stores service details associated with each building (800). The service details include any one of a service history for each of the plurality of smoke alarm systems (900) installed at the building (800) and the relevant trades person's name and contact details.

The server (120) is linked to and maintains all data within the database (130).

The server (120) collects and records data output from each of the smoke alarm systems (900) in the database (130), typically against a smoke alarm system record corresponding to each respective smoke alarm system (900).

The remotely accessible server (120) continuously or periodically monitors the database (130) for changes in operational data or data output for any one of the plurality of smoke alarm systems (900). The server (120) is configured to generate an alert when a change in the data output is indicative of a failing smoke alarm system (900) or an operational anomaly.

The database (130) additionally includes scheduling data for periodic remote testing of one or more selected smoke alarm systems (900). In such scenarios, the server (120) issues the testing command to the one or more selected smoke alarm systems (900) based on the scheduling data.

In some embodiments, the server (120) may generate and/or transmit an alert to the property manager user (700) and/or a tenant/occupant user (600) near the one or more selected smoke alarm systems (900) being tested alerting them of the scheduled test. The alert is sent to an external processing device (140) of the property manager user (700) and/or the tenant/occupant user (600) by way of data communication enabled by a software application installed on the external processing device.

The remotely accessible server (120) is configured to transmit communications to and receive communications from each controller (110) and each external processing device (140) over a communications network, which includes, amongst others, the Internet, LANs, WANs, GPRS network, a mobile communications network, a radio network (UHF-band), etc.

Communications between the at least one remotely accessible server (120) and each external processing device (140) requires authentication, such as, e.g., identifiers, passwords, captcha and/or two-factor (2FA) authentication.

As indicated, each end user interacts with the system (100) via an external processing device (140).

The external processing device (140) can include a computer, a tablet, a smart phone, a smart watch or a PDA, for example.

The external processing device (140) connects to the at least one remotely accessible server (120) via a wired connection or a wireless connection over a wireless network (e.g., Wi-Fi (WLAN) communication, RF communication, infrared communication, or Bluetooth™).

Each external processing device (140) and/or the at least one remotely accessible server (120) includes software configured to be run on the external processing device (140) and/or the server (120) for interacting with the system (100). The software is interactive.

For example, in embodiments in which the external processing device (140) is a smart device, such as, e.g., a smart phone, smart tablet or smart watch, the software is in the form of an app configured to be run on the external processing device (140).

In embodiments, in which the external processing device (140) is a computing device, such as, e.g., a laptop or desktop computer, the software is a software program, browser extension and/or plug-in extension configured to be run on the external processing device (140).

In other embodiments, the remotely accessible server (120) includes a web server providing a graphical user interface through which a user can interact with the system (100) and the remotely accessible server (120) via their external processing device (140).

As indicated, the system (100) is generally directed towards property manager users (700) and provides full access to registered property managers for the relevant buildings (800) they are responsible for.

However, in some embodiments, the system (100) additionally provides limited access to other user types, such as, e.g., landlords, occupants/tenants and/or trades persons.

For example, in one such embodiment, an occupant/tenant user (600) can interact with the remotely accessible server (120) to input and/or modify contact numbers, emails, and names and/or desired scheduling for self-testing of the one or more smoke alarm systems (900) in their tenancy or dwelling. Further, and once registered, the occupant/tenant user (600) will receive alerts and/or notifications from the system (100) about upcoming tests.

In another such embodiment, and upon receiving authentication details, a trades person user (500) can interact with the remotely accessible server (120) to receive details of one or more smoke alarm systems (900) requiring servicing. The details may additionally include a location of the smoke alarm system (900), the contact details of the owner/occupant/tenant of the tenancy or dwelling and/or a complete service history of the smoke alarm system (900). Further, upon completion of the service, the trades person user (500) can input updated details about the service performed, such as, e.g., battery replaced, or smoke alarm system replaced.

As indicated, the at least one remotely accessible server (120) includes a report function in which the server (120) interrogates the database (130) and generates a report for transmission to a user via the external processing device (140).

In some embodiments, the report includes a schedule of testing for one or more selected smoke alarm systems (900) in an occupancy/tenancy and/or building (800).

In other embodiments, the report includes a log of all past testing data for the one or more selected smoke alarm systems (900) in an occupancy/tenancy and/or building (800).

In yet other embodiments, the report includes a fault and/or service request report for any of the one or more selected smoke alarm systems (900) in an occupancy/tenancy and/or building (800) that failed testing or exhibited operational anomalies.

In further embodiments, the report includes a smoke alarm system compliance report for the one or more selected smoke alarm systems (900) in an occupancy/tenancy and/or building (800). In such embodiments, the report is in a form that can be printed or electronically submitted to a relevant building or tenancy office for compliance purposes.

FIG. 2 shows another embodiment of the system (100) for remotely testing smoke alarm systems (900). For convenience, features that are similar or correspond to features of the first embodiment will be referenced with the same reference numerals.

Referring to FIG. 2, the system (100) includes three controller (110) each in wireless communication with a plurality of smoke alarm systems (900) over a 433 MHz wireless network frequency. Each controller (110) is associated with a building (800; not shown) containing the smoke alarm systems (900).

Each controller (110) in turn is in wireless communication with a remotely accessible server (120), which in turn can be accessed by an end user for interacting with the system (100) using an external processing device (140).

Each controller (110) is capable of communicating with up to 1,000 smoke alarm systems (900).

Figure 3:
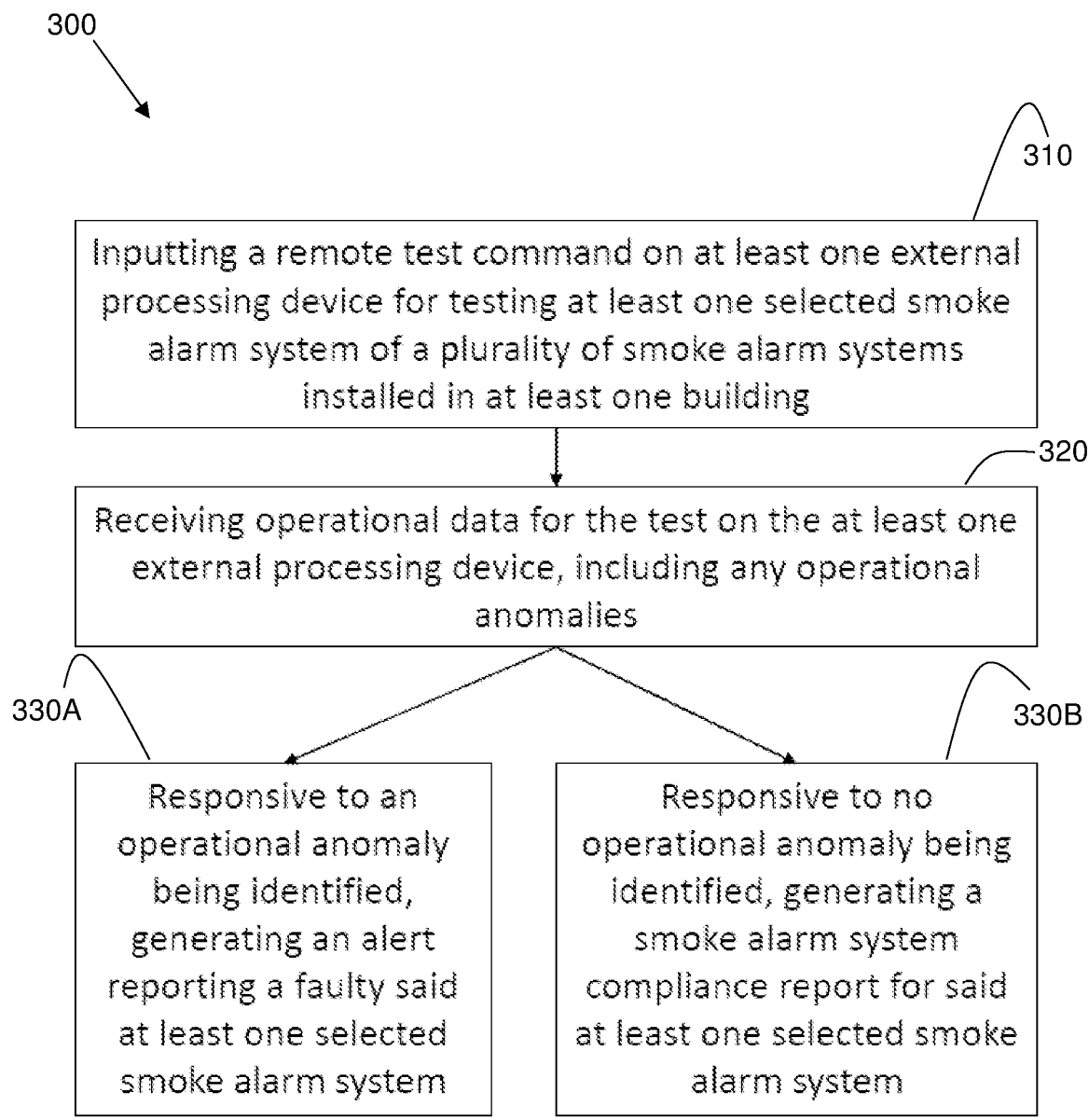
FIG. 3 is a flowchart showing steps in a method of remotely testing smoke alarm systems according to an embodiment of the present invention.

A method (300) of using the system (100) as shown in FIG. 1 to remotely test smoke alarm systems (900) is now described in detail with reference to FIG. 3.

At step 310, a property manager user (700) inputs a remote test command for one or more selected smoke alarm systems (900) in a selected building (800) using his or her external processing device (140).

The remote test command can include a single test or the inputting of a periodic testing schedule, such as, e.g., weekly, fortnightly, monthly, biannually, or annually.

In some embodiments, the inputting includes the use of an app configured to run on a mobile external processing device (140), such as, e.g., a smart phone.

In other embodiments, the inputting includes the running of a software program, browser extension and/or plug-in extension on an external processing device (140), such as, e.g., a computer.

In yet other embodiments, the inputting includes interacting with the remotely accessible server (120) by way of a web server using a browser on an external processing device (130).

At step 320, the property manager user (700) receives operational data for the remote test on the external processing device (140), including any operational anomalies identified.

The operational data is received in the form of a report on the outcome of the testing.

The report indicates whether or not the one or more selected smoke alarm systems (900) passed the test function.

Further, the operational data includes whether any one of the one or more selected smoke alarm systems (900) exhibited any operational anomalies, such as, e.g., if the smoke alarm system (900) failed the test function, whether the smoke alarm system (900) is reporting properly when polled and/or in the event of battery-powered smoke alarm systems (900), whether the battery is reporting a low charge.

At step 330A, and responsive to an operational anomaly being identified, the at least one remotely accessible server (120) generates and transmits an alert to the external processing device (140) of the property manager user (700) reporting the faulty smoke alarm system (900).

In some embodiments, the server (120) additionally sends a service request to a trades person user (500), or, alternatively, prompts the property manager user (700) to send the service request to the trades person user (500).

The alert include details of the faulty smoke alarm system (900), including any one of location details, service history details, address details, occupancy/tenancy details, and landlord details.

At step 330B, and responsive to no operational anomaly being identified, the server (120) generates and transmits a smoke alarm system compliance report to the external processing device (140) of the property manager user (700) for the one or more selected smoke alarm systems (900) in the selected building (800).

The report is generated in a form for submission to a relevant building or tenancy office for compliance purposes, where necessary.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A remote testing system for remotely testing smoke alarm systems in multiple buildings, said system comprising:
    at least one controller associated with each of the multiple buildings having a plurality of smoke alarm systems installed therein, said at least one controller being in communication with the plurality of smoke alarm systems;
    at least one remotely accessible server remotely located offsite relative to the multiple buildings, said at least one remotely accessible server operatively connected to the at least one controller for receiving and monitoring output data from the plurality of smoke alarm systems and for issuing a testing command to at least one selected smoke alarm system of the plurality of smoke alarm systems via said at least one controller;
    at least one database remotely located offsite relative to the multiple buildings, said at least one database operatively associated with the at least one remotely accessible server for storing operational data, comprising at least an operational status, testing data and location of each of the plurality of smoke alarm systems tested; and
    at least one external processing device connectable to the at least one remotely accessible server and programmed to:
    receive an input command from a user to remotely test said at least one selected smoke alarm system of the plurality of smoke alarm systems;
    instruct said at least one remotely accessible server to issue said testing command to said at least one selected smoke alarm system via said at least one controller;
    receive said operational data for the test from the at least one database comprising any operational anomalies; and one of:
    responsive to an operational anomaly being identified, generate an alert reporting a faulty said at least one selected smoke alarm system; and
    responsive to no operational anomaly being identified, generate a smoke alarm system compliance report for said at least one selected smoke alarm system,
    wherein the at least one remotely accessible server continuously monitors the at least one database for changes in operational data or data output for any one of the plurality of smoke alarm systems and generates an alert when a change in operational data or data output is indicative of a failing smoke alarm system or an operational anomaly.

2. The system of claim 1, wherein the user is a property manager of the multiple buildings.

3. The system of claim 1, wherein the testing command is configured to cause the at least one selected smoke alarm system to perform a self-test function in which an alarm circuit of the at least one selected smoke alarm system is temporarily closed.

4. The system of claim 1, wherein the controller is a processing device comprising one or more processors and one or more memory units.

5. The system of claim 1, wherein at least one controller is connected to the plurality of smoke alarm systems by a wired connection.

6. The system of claim 1, wherein the at least one controller is connected to the plurality of smoke alarm systems by a wireless connection.

7. The system of claim 1, wherein the at least one controller includes a mains power supply and a redundant on-board power source for powering the controller during power interruptions.

8. The system of claim 1, wherein the at least one controller is a 4G NB-IoT bridge.

9. The system of claim 1, wherein the at least one remotely accessible server is linked to the at least one database for maintaining all data within the at last one database.

10. The system of claim 1, wherein the at least one remotely accessible server collects data output from each of the plurality of smoke alarm systems and records the data against a smoke alarm system record corresponding to each of the plurality of smoke alarm systems.

11. The system of claim 1, wherein the input command from the user includes a schedule testing command for periodic remote testing of the at least one selected smoke alarm system, and wherein the remotely accessible server upon receiving the schedule testing command looks up scheduling data stored in the at least one database and issues the testing command to the at least one selected smoke alarm system based on the scheduling data.

12. The system of claim 11, wherein the at least one remotely accessible server generates and transmits an alert to the external processing device of a tenancy or occupant near the at least one selected smoke alarm system advising of the scheduled test.

13. The system of claim 1, wherein responsive to an operational anomaly being identified, the at least one remotely accessible server additionally generates and transmits a service request for the at least one selected smoke alarm system to a registered service provider.

14. A method of remotely testing smoke alarm systems in multiple buildings, said method comprising:
   providing the remote testing system of claim 1;
   inputting a remote test command on at least one external processing device of the system for testing at least one selected smoke alarm system of a plurality of smoke alarm systems installed in at least one of the multiple buildings;
   receiving operational data for the testing on the at least one external processing device, comprising any operational anomalies; and one of:
   responsive to an operational anomaly being identified, generating an alert reporting a faulty said at least one selected smoke alarm system; and
   responsive to no operational anomaly being identified, generating a smoke alarm system compliance report for said at least one selected smoke alarm system.

15. The method of claim 14, wherein the receiving includes generation of a report on the testing.

16. The method of claim 14, wherein, responsive to an operational anomaly being identified, the alert generated includes any one of details of a location of the faulty said at least one selected smoke alarm system, service history details, address details, occupancy/tenancy details and landlord details.

17. The method of claim 14, wherein, responsive to no operational anomalies being identified, the smoke alarm system compliance report is generated in a form for submission to a relevant building or tenancy office.

18. The method of claim 16, further comprising generation of a service request to a registered service provider for servicing the faulty said at least one selected smoke alarm system, said service request comprising any one of details of a location of the faulty said at least one selected smoke alarm system, service history details, address details, occupancy/tenancy details and landlord details.

19. The method of claim 16, wherein the user is prompted by the system to send a service request regarding the faulty said at least one selected smoke alarm system.

* * * * *